B. JOHNSON.
COTTON PICKER.
APPLICATION FILED APR. 24, 1916.
1,215,660.
Patented Feb. 13, 1917.
i SHEETS—SHEET 3.
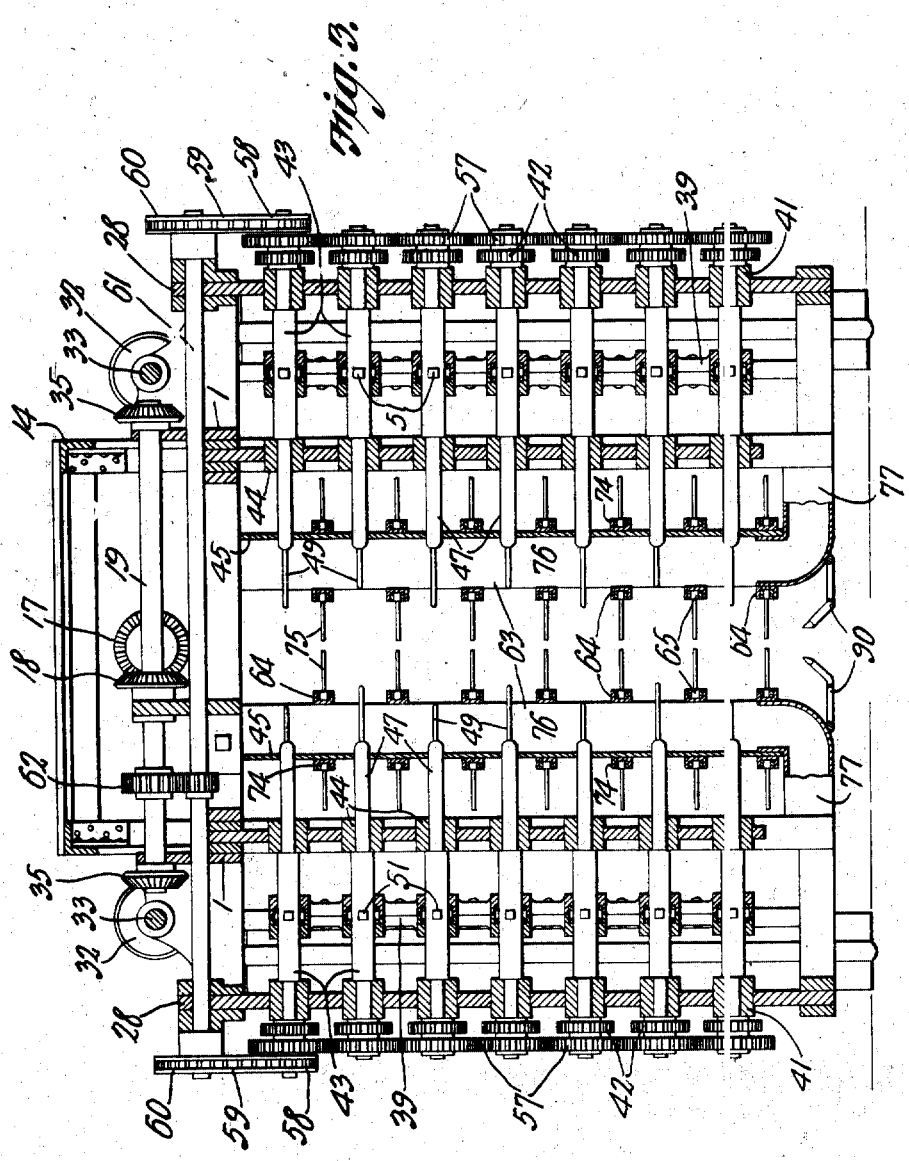
Witnesses
J R Finley
R L Parker
B. Johnson   Inventor
by C A Snow & Co.
Attorneys

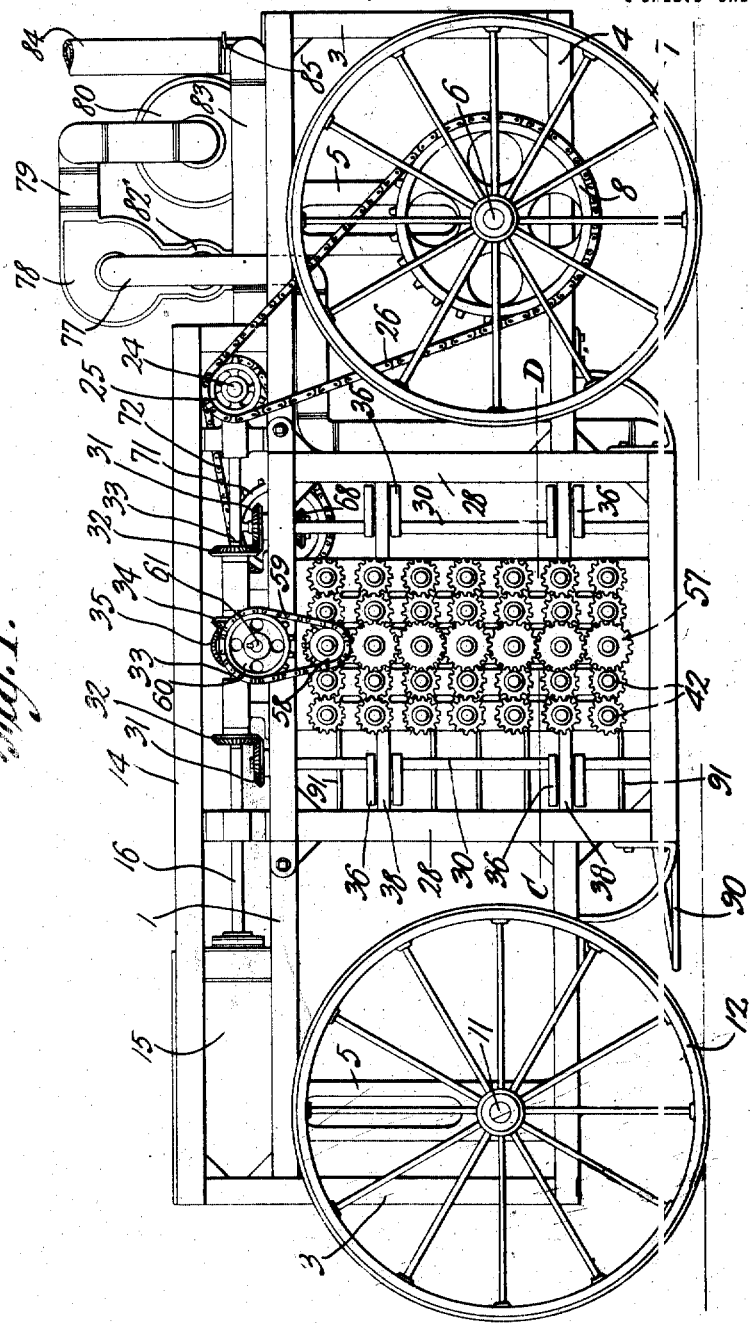

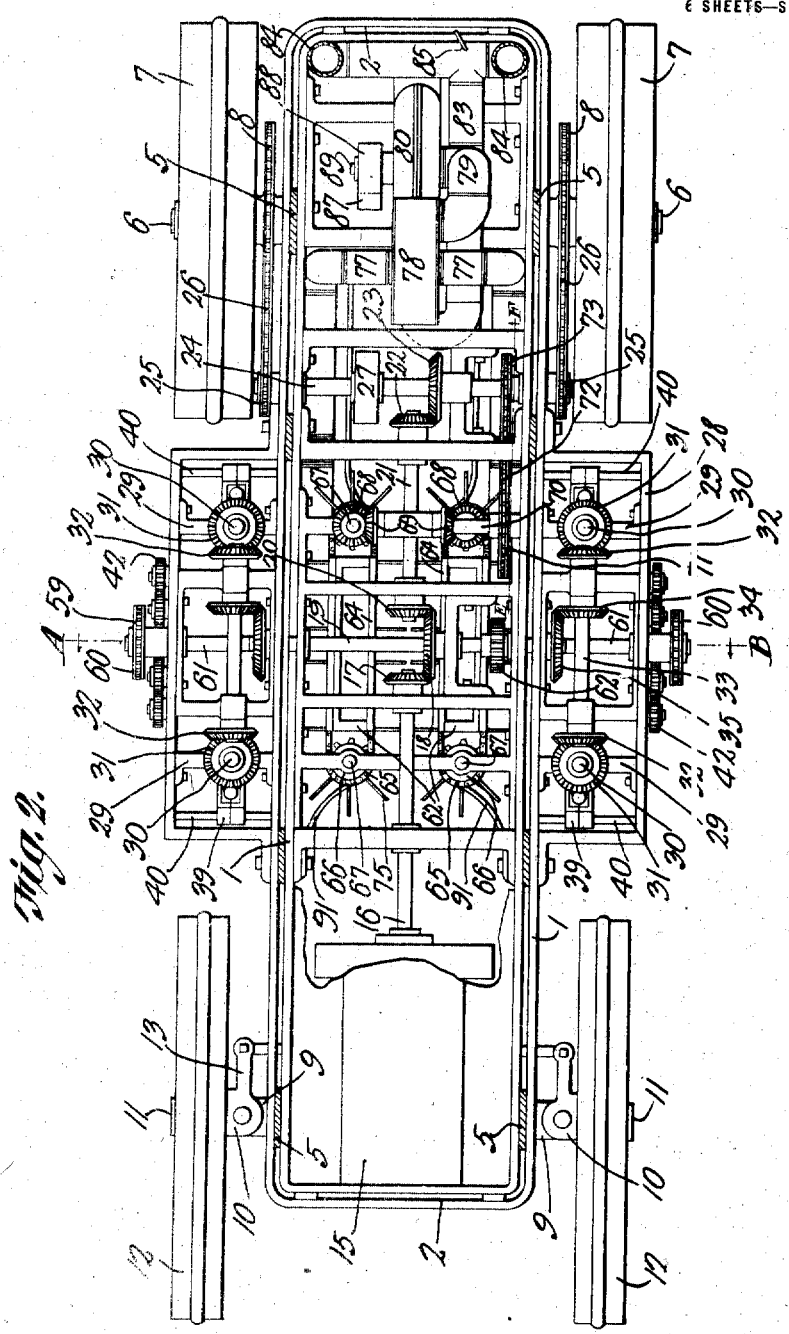

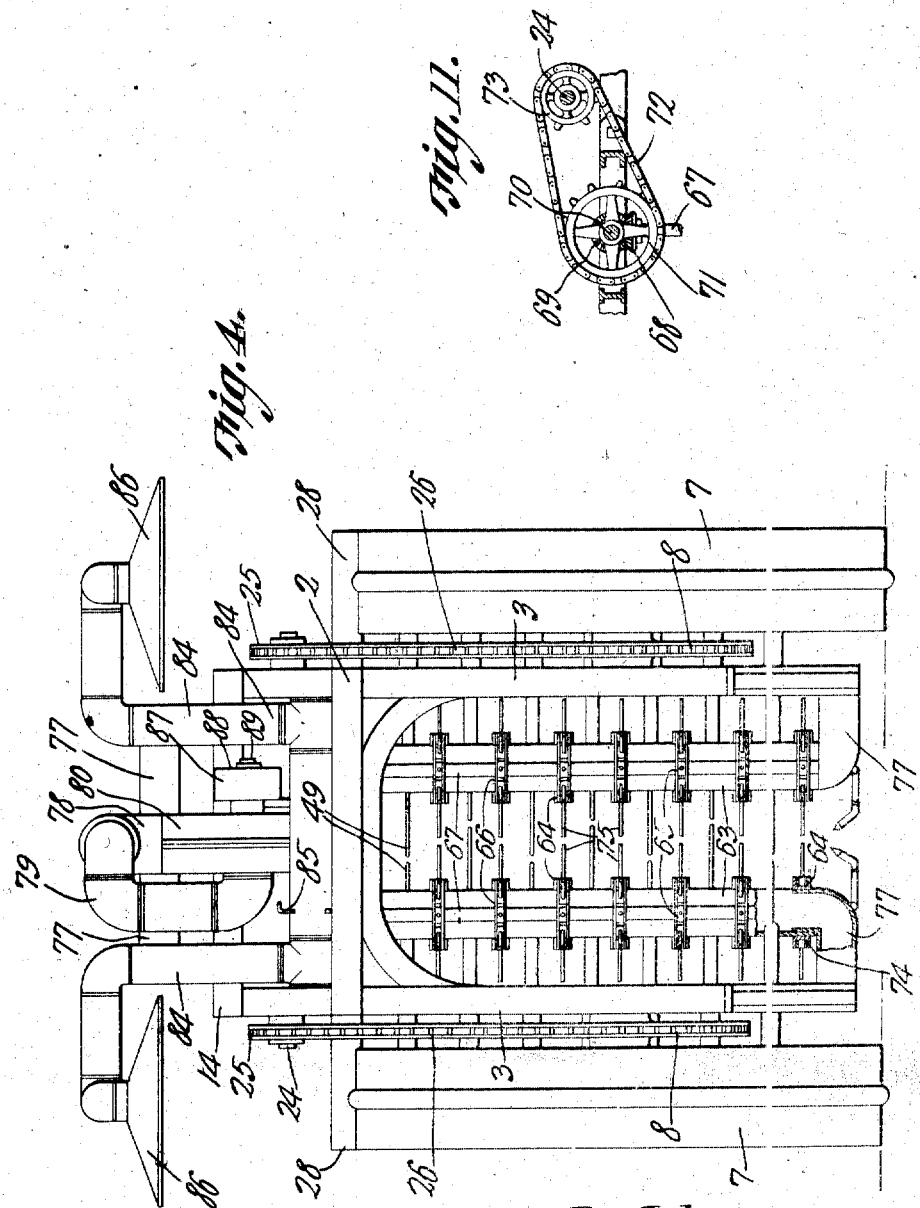

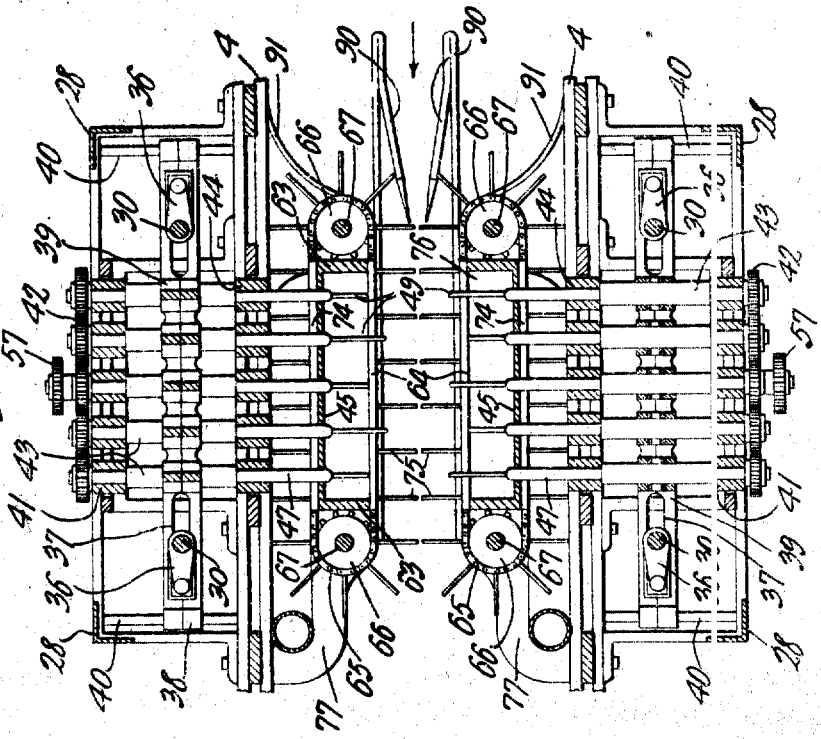

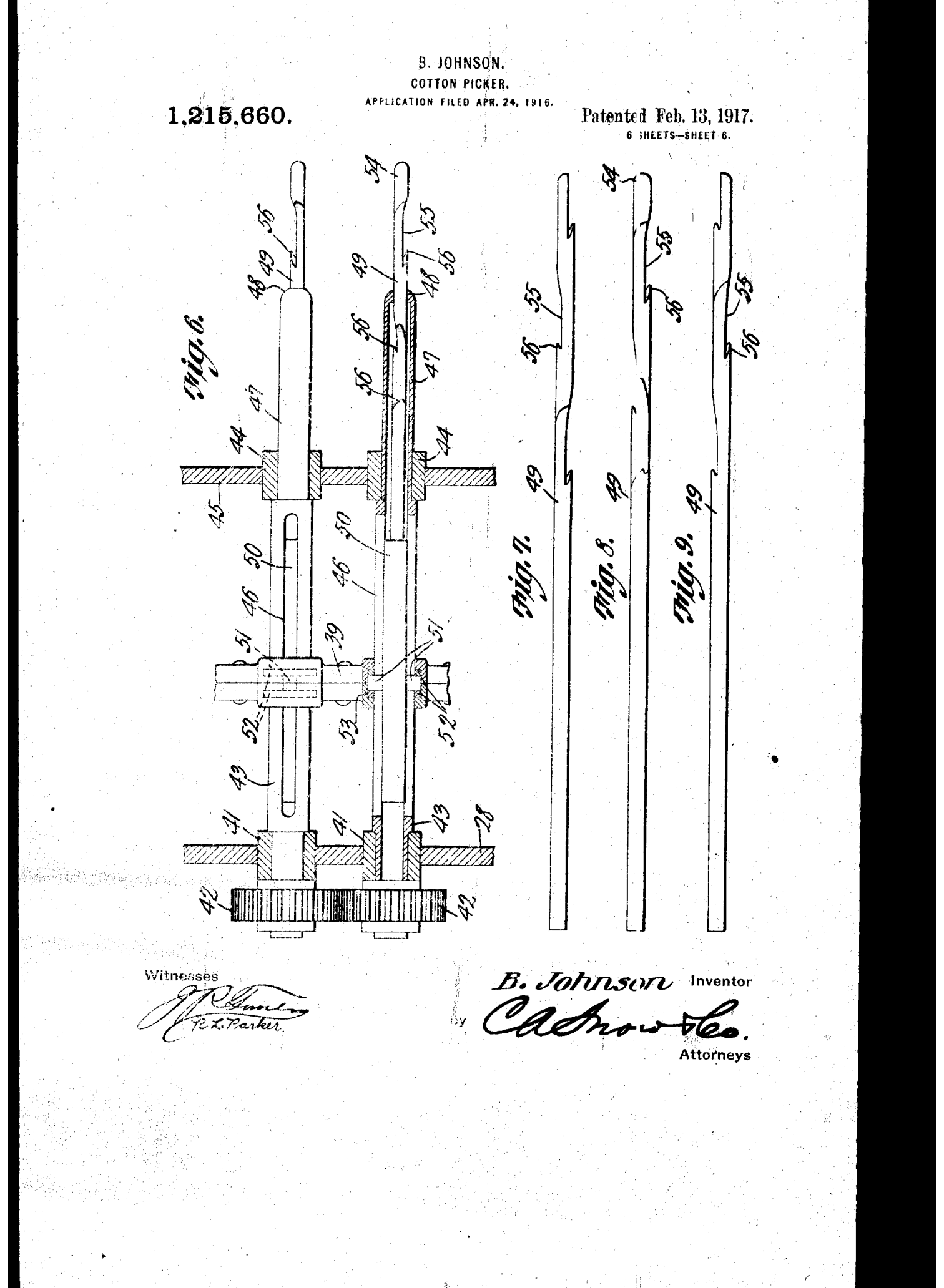

B. JOHNSON.
COTTON PICKER.
APPLICATION FILED APR. 24, 1916.

1,215,660.

Patented Feb. 13, 1917.
6 SHEETS—SHEET 6.

B. Johnson, Inventor
by C.A. Snow & Co., Attorneys

Witnesses

UNITED STATES PATENT OFFICE.

BILLIE JOHNSON, OF TEMPLE, TEXAS.

COTTON-PICKER.

1,215,660.  Specification of Letters Patent.  Patented Feb. 13, 1917.

Application filed April 24, 1916. Serial No. 93,189.

*To all whom it may concern:*

Be it known that I, BILLIE JOHNSON, a citizen of the United States, residing at Temple, in the county of Bell and State of Texas, have invented a new and useful Cotton-Picker, of which the following is a specification.

This invention relates to machines for harvesting cotton, the same being more especially of that type utilizing picking needles designed to enter among the plants in a row and to engage the cotton fiber which is withdrawn from the plants by a reverse movement of the needles.

One of the objects of the invention is to provide a machine of this character utilizing opposed gangs or units of picking needles having means whereby they are simultaneously rotated and, at regular intervals, projected into the row of plants between the units, this projection taking place during the rotation of the needles.

A further object is to provide means for retracting the rotating needles so as to withdraw the cotton fiber from the plants, such retraction resulting in the stripping of the cotton fiber from the needles so that it will be deposited in receivers provided therefor.

A further object is to provide means whereby the stripped cotton is conveyed to a sacking means carried by the machine.

Another object is to provide a picking needle of novel form which is so constructed that it will only engage the cotton fiber, with the result that the cotton delivered into the machine will be in a clean condition and practically free of leaves, twigs and the like.

A still further object is to provide a machine of this character which is driven by a motor, said motor operating also to drive the needles about their longitudinal axes and for reciprocating them.

A further object is to provide novel mechanism for reciprocating the needles.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed without departing from the spirit of the invention.

In the accompanying drawings the preferred form of the invention has been shown.

In said drawings:—

Figure 1 is a side elevation of the machine.

Fig. 2 is a plan view thereof, a portion of the structure being broken away.

Fig. 3 is an enlarged section on line A—B Fig. 2.

Fig. 4 is a rear elevation, portions being broken away.

Fig. 5 is a section through the picking units and adjacent parts, said section being on the line C—D Fig. 1.

Fig. 6 is an enlarged view partly in section and partly in elevation of two of the picking needles and portions of their operating means.

Fig. 7 is an elevation of one of the picking needles.

Fig. 8 is another elevation of the needle turned through ninety degrees from the position shown in Fig. 7.

Fig. 9 is an elevation of the needle turned through ninety degrees from the position shown in Fig. 8.

Fig. 10 is a view more or less in diagram of the cotton conveying flues and the coöperating parts.

Fig. 11 is a section on line E—F Fig. 2.

Referring to the figures by characters of reference 1 designates the upper main beams of the frame of the machine secured to or merging into the end cross beams 2. Upstanding corner posts 3 are connected to the ends of the beams 1 and extend downwardly to and are secured upon the free end portions of lower side beams 4. No connection is provided between the end portions of the opposed side beams 4 and, consequently, an unobstructed opening is thus provided throughout the length of the frame for the reception of a row of plants straddled by the machine.

Connecting the upper and lower side beams 1 and 4 near the front and rear ends thereof are frame members 5. Stub shafts 6 are extended laterally from the rear frame members 5 and journaled thereon are supporting wheels 7 to which are secured sprockets 8. Studs 9 are extended laterally from the front frame members 5 and connected thereto by knuckles 10 are spindles 11 on which are journaled the front supporting wheels 12. These spindles are adapted to be actuated by any suitable steering mechanism shown generally at 13.

Arranged above the beams 1 is a superstructure 14 and arranged within the superstructure is a motor 15 adapted to drive a longitudinal shaft 16 provided, at its rear end, with a bevel gear 17. This gear meshes with a gear 18 secured to a transverse shaft 19 and gear 18, in turn, meshes with a gear 20 secured to a longitudinal shaft 21. Shaft 21 has a gear 22 meshing with a gear 23 secured to a transverse shaft 24 and on this transverse shaft at its ends, are sprockets 25 which transmit motion through chains 26 to the sprockets 8. It is to be understood that any suitable arrangement of clutches, not shown, may be provided for controlling the actuation of the wheels 7 by motor 15.

A pulley 27 can be secured to the shaft 24 as shown.

Extending laterally from the main frame of the machine consisting of the beams 1 and 4 and the connections therebetween, are side frames 28 which extend downwardly close to the ground. The side frames are provided with bearings 29 in which are journaled vertical shafts 30 located within the side frames near the front and rear ends thereof respectively. Each shaft 30 is provided, at its upper end, with a gear 31 meshing with a gear 32. These gears 32 have secured thereto a shaft 33 receiving motion through the gears 34 and 35 from the transverse shaft 19.

Each shaft 30 is provided with upper and lower cranks 36, cams, eccentrics or the like which work within the longitudinal slots 37 formed in upper and lower arms 38 extending forwardly and rearwardly from a cross head 39. These arms are mounted on transverse guides 40 supported by the side frames 28 and it will be obvious that during the continuous rotation of the crank shafts 30 the cross heads will be reciprocated transversely of the side frames 28.

Arranged in the outer side of each of the side frames 28 are vertical series of bearings 41 and a gear 42 is arranged adjacent each bearing and secured to a tubular guide 43. These guides are all parallel and extend through bearings 41, and inwardly through bearings 44 supported by the inner sides of the side frames 28 and which inner sides have been indicated at 45 in Fig. 6. Each of the guides 43 has longitudinal slots 46 in opposite portions and those portions of the guides extending through and inwardly beyond the bearings 44 are preferably reduced in diameter, thus to form tubular stripping fingers 47. The free ends of these stripping fingers are rounded, as shown at 48 and working within these free ends are needles 49. Each needle projects from a cylindrical slide 50 housed in the guide 43 and projecting from each slide are oppositely extending trunnions 51 which work within and project beyond the slots 46. The projecting portions of the trunnions are provided with washers 52 which act as anti-friction rollers. These washers work within annular channels 53 formed in the cross head 39 and which channels extend around the guides 43. In order that the cross head may be properly assembled relative to the pins or trunnions 51, said cross head is preferably made up of two opposed plates or castings joined together by rivets or in any other suitable manner, as shown particularly in Fig. 6.

The outer or free end of each needle 49 is rounded as shown at 54 and arranged spirally about the needle are elongated depressions 55 which gradually increase in depth away from the free end of the needle and terminate in overhanging shoulders 56 which are cut away diagonally to form teeth which are extended obliquely to the plane of rotation of the tooth and also to the longitudinal axis of movement of the needle. In other words the teeth, which are contained within the bounds of the circumference of the needle are so shaped that they will wipe past any material, fibrous or otherwise, with which they may contact while rotating, unless, at the same time, the needle is pressed outwardly away from the stripping finger in which event the points of the teeth will be buried into any fibrous material with which they may come into contact, resulting in the fibrous material being wound upon the needle. However, should the needle be projected longitudinally without being rotated, the point of the tooth being contained within the circumference of the needle, it would not engage any fibrous material but would wipe past it.

Any desired number of picking needles can be used and the needles at each side of the machine or, in other words, the needles constituting each unit are preferably arranged in parallel vertical rows. The gears 42 of the needles of each row are constantly in mesh with the corresponding gears of the next adjoining row so that the gears are thus arranged in horizontal series as shown particularly in Fig. 1. A larger gear 57 is connected to and rotates with one of the gears 42 in each of the horizontal series and all of the gears 57 are in mesh with each other so that when one of them is actuated, motion will be transmitted to all of the gears 42 of one unit.

For the purpose of actuating the gears 57 and 42, a sprocket 58 is secured to and rotates with one of the gears 57 and this sprocket is driven through a chain 59 from a sprocket 60 secured to a transverse shaft 61 arranged close to and under the shaft 19 and receives motion therefrom through gears 62.

Secured along the front and back portions of each of the supporting walls 45 are inwardly projecting flanges 63 connected along their inner vertical edges by channel strips 64 constituting guides for endless chains 65. These endless chains are mounted on sprockets 66 secured to vertical shafts 67 and the two vertical shafts 67 near the back end of the machine are provided at their upper ends with gears 68 meshing with gears 69 secured to a transverse shaft 70. A sprocket 71 is secured to shaft 70 and receives motion through a chain 72 from a sprocket 73 secured to the transverse shaft 24.

The endless chains 65 are extended substantially horizontally and move longitudinally within the guides 64 and thence along the outer sides of the walls 45, there being guides 74 on the outer sides of said walls and within which the endless chains work. Plant engaging fingers 75 are extended horizontally from the chains 65, the fingers on the opposed chains being adapted to work close together, as shown particularly in Fig. 5.

Each wall 45 together with its flanges 63 forms a vertical receiver 76 the inner side of which is open but provided with the channeled guides 64. The lower end of each of the receivers 76 opens into a conduit 77. The two conduits are extended upwardly and open into opposite sides respectively of a separator casing 78. This casing has a screen 78' extending from side to side thereof and forming a cotton receiving chamber having an opening in the bottom through which cotton is free to pass. Thus when the air carrying cotton enters the casing 78, the cotton will be held in said casing by the screen while the air will be separated therefrom and will pass through the screen into flue 79 and thence into a fan casing 80. The outlet or exhaust flue 81 extends from this fan casing to the cotton receiver 82 of the separator this receiver being located below a revoluble feeder 82' driven in any suitable manner. A flue 83 extends from the receiver to oppositely extending flues 84, there being a valve 85 for directing the air and cotton from flue 83 into either of the branch flues 84. Each branch flue 84 has an upwardly extending portion opening downwardly into a hood 86 on which the open end of a sack is adapted to be fastened. The fan in the casing 80 is adapted to be driven by means of a belt 87 which transmits motion from the pulley 27 to a pulley 88 secured to the shaft 89 of the fan.

Forwardly extending lifting fingers 90 are provided at the inner sides of the front ends of the side frames 28, the inner portions of these fingers being inclined inwardly and upwardly so that should they come against any plants which have been beaten down onto the ground, they will tend to lift them where they can be engaged by the fingers on the endless chains 65. Gathering fingers 91 can also be arranged in vertical series along the inner portion of the front of each side frame, these fingers being curved rearwardly and inwardly to points adjacent the front shafts 67 so as to constitute means for deflecting the plants laterally into the plant receiving passage formed between the opposed chains 65 and their guides 64.

As has heretofore been pointed out, the herein described machine is adapted to be driven forward under its own power and at any predetermined speed desired. The gearing is so proportioned that the inwardly projecting fingers 75 will move rearwardly along the guides 64 at the same speed that the machine is moving forwardly. Thus any standing plants engaged by the fingers 75 will be held in upstanding positions while the machine is passing along the row and will not be pulled forwardly and downwardly as would otherwise be the case. The lifting fingers 90 and the gathering fingers 91 will press the side portions of the plants inwardly so that the said plants will be tightly compressed and directed in this condition between the guides 64 where they are engaged by the fingers 75. As the machine is passing along the row of plants, the vertical shaft 30 will be rotated, thus causing lateral reciprocation of the heads 39, such reciprocation causing the needles 49 to reciprocate in the space between the opposed walls 45. It will be noted by referring particularly to Fig. 3 that the needles are disposed in staggered relation, there being a long needle opposite a short needle and a long needle interposed between two short needles. During the reciprocation of the needles, at which time they are thrust transversely into the compressed plants, said needles are rotated by means of the gears 42 and 57, hereinbefore described. During the thrusting of the needles into the plants while said needles are rotating, the teeth 56 will engage any of the exposed cotton fiber with which they can come into contact and will cause the fiber to be wrapped about the needles and pulled from the burs. During the retraction of the needles into their guides 43, the cotton fiber adhering to the needles will be stripped therefrom by the curved ends 48 of the guides. The stripped cotton will drop downwardly within the receivers 76 and into the cotton receiving conduits 77. The cotton will be sucked through the conduits into the separator 78. At this point the air will flow through screen 78' and the flue 79 into the fan casing 80 while the cotton will drop into and out the feeder 82' and be shifted into the receiver 82 where it will be met by the air exhausted from the casing 80 and will be driven through flue 83 into one or the other of the branch flues 84. By thus separating the air from the cotton within the separator 78, the cotton is prevented from passing through the fan casing and being torn up by the rotating fan. The direction of movement of cotton can be controlled by the valve 85. For example, a sack can be suspended from one of the hoods 86 and cotton directed into said sack while the air will be cut out of communication with the other hood 86 while a filled sack is being removed therefrom and a new one substituted. As soon as one sack is filled the valve can be shifted to direct the air and cotton through the other branch flue and into the empty sack and during the filling of this last sack a new sack can be placed upon the other hood 86. Thus no time will be lost in the sacking of the cotton as sacks can be placed alternately upon the two hoods and the cotton directed toward one hood or the other as desired.

By having the needles of different lengths, they will not all come together along the vertical center of the row of compressed plants but, instead, they will project to different distances into the row, thus avoiding any danger of missing some of the opened cotton bolls.

Although means has been shown and described for simultaneously actuating the picking needles by means of the cranks 36 or the like, it is to be understood that no invention would be necessary to arrange the picking needles in units so that the several units would be projected into the row of cotton plants at different times instead of simultaneously.

The trunnions 51 obviously cause the picking needles 49 and the tubular guide 43 to travel together. By reason of this arrangement of parts, when the picking needle 49 is returning into the tubular guide 43 any cotton adhering to the needle will be stripped therefrom. As the parts are constantly rotating during this action of the picking needle there is no tendency for the cotton to wrap or twist as it comes into contact with the end of the guide 43. Thus when the cotton is dropped from the needle it will be in the same condition as when picked from the bur and not twisted. The rapid rotation of the picking needles and their guides results in throwing off trash such as leaves, burs, etc., leaving the cotton clean.

What is claimed is:—

1. A machine for harvesting cotton including opposed cotton receivers having open inner sides, guides extending across said open inner sides, endless means traveling within the guides and having portions extending beyond the guides for maintaining plants in upstanding positions during the passage of the machine along the row of plants, picking devices movable transversely across and between the receivers, means for stripping cotton from the picking devices while in the receivers, means at the bottom of each receiver for receiving the picked cotton, and means for removing the cotton from said receiving means.

2. A machine for harvesting cotton including a portable structure having an opening therethrough for the reception of plants in a row, heads mounted for transverse reciprocation at opposite sides of the opening, a plurality of revoluble guides at each side of the opening and slidably engaged by the heads, needles revoluble with the guides, means for transmitting motion from the heads to the needles whereby the heads and needles reciprocate together.

3. A machine for harvesting cotton including a portable structure having an opening therethrough for the reception of plants in a row, heads mounted for transverse reciprocation at opposite sides of the opening, a plurality of revoluble guides at each side of the opening and slidably engaged by the heads, needles revoluble with the guides, means for transmitting motion from the heads to the needles whereby the heads and needles reciprocate together, the corresponding needles at the two sides of the opening being in substantially horizontal alinement, the alining needles being of different lengths.

4. In a machine for harvesting cotton, a portable structure, transverse guides therein, there being a longitudinal opening within said structure for the reception of plants in a row, a plurality of tubular guides at each side of the opening, means for rotating all of the guides simultaneously, needles mounted for reciprocation within the respective revoluble guides, a head slidably mounted on all of the guides at each side of the opening, means for transmitting motion from the heads to the needles during the rotation of the needles and their guides, longitudinally slotted arms extending from each of the heads, and shafts mounted for rotation and having cranks working within the slots, said cranks coöperating with the arms to reciprocate the heads toward and from each other during the rotation of the needles and their guides.

5. In a machine for harvesting cotton, the combination with a portable structure having an opening therethrough for the reception of plants in a row, and a receiver at each side of the opening and extending longitudinally and vertically thereof, of means working transversely of the receiver and the opening for picking cotton and discharging it into the receiver, separate sacking hoods, and means for directing the cotton from the receiver into either of said hoods.

6. In a machine for harvesting cotton, a picking unit including a plurality of revoluble tubular guides, said guides being slotted longitudinally, a needle slidably mounted within each guide, projections on the needle and extending through the slot in its guide, a head engaging the projections on all of the needles of said unit and mounted for reciprocation upon the revoluble guides.

7. In a machine for harvesting cotton, a picking unit including a plurality of revoluble tubular guides, said guides being slotted longitudinally, a needle slidably mounted within each guide, projections on the needle and extending through the slot in its guide, a head engaging the projections on all of the needles of said unit and mounted for reciprocation upon the revoluble guides, said head including separate opposed plates having annular recesses therein, the projections on the needles being revoluble within said recesses.

8. In a machine for harvesting cotton, a picking unit including a plurality of revoluble tubular guides, said guides being slotted longitudinally, a needle slidably mounted within each guide, projections on the needle and extending through the slot in its guide, a head engaging the projections on all of the needles of said unit and mounted for reciprocation upon the revoluble guides, arms extending from the head and having longitudinal slots therein, revoluble shafts adjacent the ends of the head, and cranks carried by the shafts and working within the arms to reciprocate the head upon the guides.

9. In a cotton harvesting machine, the combination with a tubular guide mounted for rotation and having a longitudinal slot, a slide within the guide, a projection on the slide and working within the slot, means mounted for reciprocation on the guide and movably engaged by the projection for reciprocating the slide, and a needle projecting from the slide and beyond one end of the guide.

10. In a cotton harvester, the combination with a portable structure having an opening therethrough for the reception of plants in a row, and means for compressing the plants within said opening, of means movable relative to the structure for engaging the plants and maintaining them in upright positions during the passage of the structure thereover, oppositely disposed gangs of needles, means for simultaneously reciprocating the needles toward and from each other to enter and withdraw from the compressed plants, the needles of each gang being in horizontal alinement with the corresponding needles of the opposed gang, the alining needles being of different lengths.

In testimony that I claim the foregoing as my own, I have hereto affixed my signature in the presence of two witnesses.

BILLIE JOHNSON.

Witnesses:
R. L. DOCKUM,
J. B. DYESS.